United States Patent
Engstrom et al.

(10) Patent No.: US 9,360,395 B2
(45) Date of Patent: Jun. 7, 2016

(54) METHOD AND DEVICE FOR DYNAMOMETER TESTING OF A MOTOR VEHICLE

(75) Inventors: Nils G. Engstrom, Ronninge (SE); Christian Engstrom, Tyreso (SE); Jonny Farnlund, Skarholmen (SE)

(73) Assignee: Rototest International AB, Rönninge (SE)

( * ) Notice: Subject to any disclaimer, the term of this patent is extended or adjusted under 35 U.S.C. 154(b) by 187 days.

(21) Appl. No.: 13/880,344

(22) PCT Filed: Oct. 17, 2011

(86) PCT No.: PCT/SE2011/051240
§ 371 (c)(1),
(2), (4) Date: Jul. 8, 2013

(87) PCT Pub. No.: WO2012/053966
PCT Pub. Date: Apr. 26, 2012

(65) Prior Publication Data
US 2013/0283900 A1    Oct. 31, 2013

(30) Foreign Application Priority Data

Oct. 18, 2010    (SE) ...................................... 1051084

(51) Int. Cl.
*G01M 17/007*    (2006.01)

(52) U.S. Cl.
CPC ........ *G01M 17/007* (2013.01); *G01M 17/0074* (2013.01)

(58) Field of Classification Search
USPC ............... 73/115.01, 116.05, 116.06, 116.07, 73/116.08, 116.09, 116.11
See application file for complete search history.

(56) References Cited

U.S. PATENT DOCUMENTS

| | | | |
|---|---|---|---|
| 4,669,318 A | 6/1987 | Angström | |
| 5,311,770 A * | 5/1994 | D'Angelo | G01M 17/0072 384/126 |
| 5,323,644 A | 6/1994 | Schaefer | |
| 5,450,748 A * | 9/1995 | Evans | G01M 17/0072 73/116.06 |
| 7,367,229 B2 | 5/2008 | Engstrom | |
| 7,743,650 B2 | 6/2010 | Engström | |
| 8,001,835 B2 | 8/2011 | Engström | |
| 8,387,449 B2 | 3/2013 | Engström et al. | |
| 2009/0107254 A1 * | 4/2009 | Engstrom | F04D 19/007 73/862 |
| 2009/0126510 A1 * | 5/2009 | Engstrom | 73/862.14 |
| 2011/0303000 A1 * | 12/2011 | Engstrom | G01M 17/0074 73/116.06 |

FOREIGN PATENT DOCUMENTS

| | | |
|---|---|---|
| WO | WO 85/04475 A1 | 10/1985 |
| WO | WO 2007/133154 A1 | 11/2007 |
| WO | WO 2011/159229 A1 | 12/2011 |

* cited by examiner

*Primary Examiner* — Eric S McCall
(74) *Attorney, Agent, or Firm* — Blank Rome LLP

(57) ABSTRACT

A dynamometer test unit for use in dynamometer testing of a vehicle, where the vehicle includes at least a first wheel shaft and at least one first vehicle power source for providing power to the first wheel shaft. The first wheel shaft is, during testing, connected to a dynamometer test unit which includes a first individually controllable dynamometer power source for applying a first power to the first wheel shaft. The dynamometer test unit further includes a second individually controllable dynamometer power source for applying a second power to the first wheel shaft. The first and the second dynamometer power source apply a controllable power to the first wheel shaft during testing. The invention also relates to a dynamometer test system.

21 Claims, 2 Drawing Sheets

METHOD AND DEVICE FOR DYNAMOMETER TESTING OF A MOTOR VEHICLE

FIELD OF THE INVENTION

This invention relates to dynamometer testing of vehicles, and in particular to a system for dynamometer testing of vehicles including at least one wheel shaft, where a vehicle power source applies power to said first wheel shaft, and where a dynamometer power source is used to absorb power applied by said vehicle power source.

BACKGROUND OF THE INVENTION

Dynamometer testing of vehicles is known per se, and can, for example, be carried out by roller type dynamometers equipped with large rollers that support the vehicle wheels, and which are used to apply a brake torque to the drive wheels of the vehicle. Such systems, however, are not always capable of providing the desired measurement accuracy and/or measurement freedom.

Another kind of vehicle dynamometers for dynamometer testing of vehicles is disclosed in U.S. Pat. No. 4,669,318 (Ångström). This document relates to an apparatus for dynamometer testing of vehicles, where load absorbing means in the form of a hydrostatic pump assembly has an input shaft for engagement with a drive shaft of a vehicle to be tested. Each drive shaft is fixedly connected to an individual apparatus of this kind, whereby a total effective torque from the vehicle can be accurately measured.

Systems of the kind disclosed in U.S. Pat. No. 4,669,318 are reliable, and are capable of accurately measuring torque in steady load situations.

It is also possible to perform more complex tests using a dynamometer testing system of the above kind, both for two-wheel drive systems, and also for four-wheel drive systems. Such more complex testing, using a system of the above kind, is disclosed in the International patent application WO2007/133154 A1 (Engstroem).

However, vehicle transmissions are becoming increasingly complex, and there is also an increasing desire to perform measurements that allows accurate measurement of various vehicle characteristics taking into account numerous situations that may occur during real life driving of the vehicle on a road.

Aim and Most Important Features of the Invention

It is an object of this invention to provide an improved system for dynamometer testing of vehicles.

According to the present invention, it is provided a dynamometer test unit for dynamometer testing of a vehicle, where the vehicle includes at least a first wheel shaft and at least one first vehicle power source for providing power to said first wheel shaft. Said first wheel shaft is, during testing, connected to said dynamometer test unit, said dynamometer test unit including:
  a first individually controllable dynamometer power source for applying a first power to said first wheel shaft,
  a second individually controllable dynamometer power source for applying a second power to said first wheel shaft, wherein
  during testing, said first and said second dynamometer power source apply a controllable power to said first wheel shaft.

The present invention has the advantage that use of dynamometer test units having two (or more) power sources allow, at least in some situations, more accurate dynamometer testing of vehicles.

In particular, the present invention is advantageous for testing of vehicles where power can selectively be applied from two (or more) separate vehicle power sources to the same wheel shaft of a vehicle e.g. to absorb a controllable power from said first wheel shaft.

For example, one of the vehicle power sources can be of a kind capable of delivering high torques at low speeds, such as e.g. a low power electric motor, while another vehicle power source being capable of providing high power at high speeds, such as e.g. higher power electric motor or combustion engine.

Use of two or more controllable dynamometer power sources (that is, power sources that repeatedly can be set to substantially desired and defined torque/power/rotational speed using direct control, i.e. by calculating a control signal by means of one or more mathematical representations of the dynamometer power source), e.g., has the advantage that the dynamometer power sources can be designed to absorb power from such vehicle power sources in a favourable manner, since use of plural dynamometer power sources connected to a single vehicle wheel shaft has the advantage that the dynamometer power sources can be designed with very varying torque absorbing characteristics.

For example, the present invention can be used for accurate testing of vehicles having hybrid drive trains, and the vehicle, e.g., can include two or more power sources acting on the same wheel shaft. Use of a dynamometer test unit according to the present invention has the advantage that the different characteristics, e.g. with regard to torque/rotational speed characteristics, that such vehicle power sources can give rise to can be accounted for.

This has the further advantage that a dynamometer test unit having two (or more) dynamometer power sources with different torque-speed characteristics allows dynamometer test units of considerably more favourable design with respect to cost/space/infrastructure requirements than would be the case with a single power source having the total capability of the two dynamometer power sources taken together.

For example, at least one of said first and second dynamometer power sources can be an electric motor. Alternatively or in addition, at least one of said first and second dynamometer power sources can be a hydraulic pump.

The present invention, thereby, provides a solution that is capable of accurately testing driving situations that can arise using sophisticated vehicle drive trains.

According to one embodiment of the invention, the dynamometer test unit includes two power sources, where at least one of said dynamometer test unit power sources is capable of providing a negative (braking) power to said wheel shaft, and one power source is capable of (at least) applying a positive (motoring) power to said wheel shaft.

This has the advantage that the present invention can be used also for testing of vehicles having means for regenerative braking, e.g. hybrid drive vehicles having a power source in the form of an electric motor. One dynamometer power source can then be used to propel the vehicle wheel shaft, so that e.g. a vehicle electric motor can be used for braking purposes, e.g., in order to simulate deceleration of the vehicle, and act as a generator instead of as a motor to regenerate electrical energy for feed-back to e.g. an energy storage.

The use of dynamometer test units being capable of providing both a negative (braking) and positive (motoring) power to a wheel shaft allows that e.g. a hybrid drive vehicle can be tested not only for accelerations, but also for complete test drives, with uphill as well as downhill driving.

Further, with regard to power being absorbed by dynamometer test units, power sources that absorb power in a way that allows intermediate storage and transportation can be used. For example, absorbed power can be converted either to electricity or hydraulic pressure. The absorbed and converted power can then be transported away from the immediate vicinity of the wheel shaft, so as to avoid problems with excessive heating at the location of power absorption.

Consequently, according to the present invention kinetic energy can be absorbed from the vehicle wheel shaft without direct conversion of at least a majority of the absorbed power to heat.

As is exemplified in the following detailed description of the present invention, there also exist numerous other situations where the present invention can be utilized.

BRIEF DESCRIPTION OF DRAWINGS

The invention will now be described in greater detail with reference to the drawings, wherein.

DESCRIPTION OF EXEMPLARY EMBODIMENTS

Figure 1:
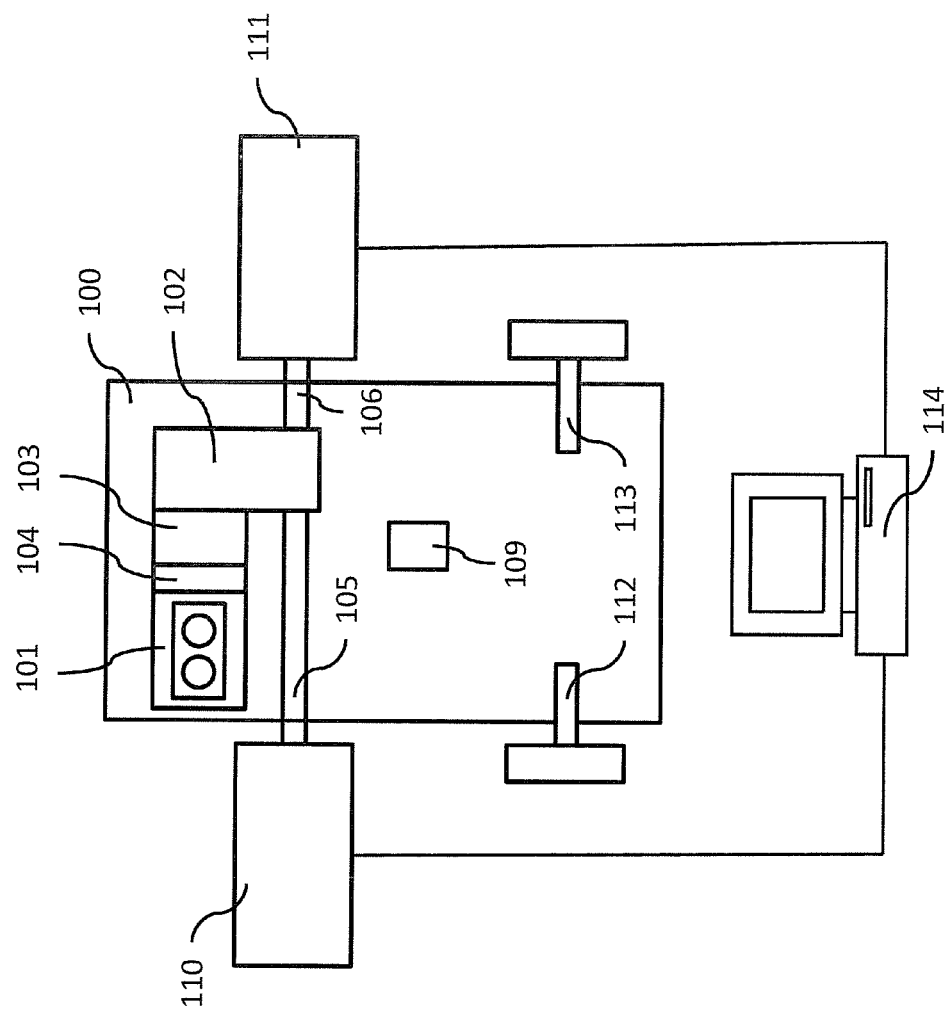
FIG. 1 shows an exemplary dynamometer test system according to the present invention.

FIG. 1 discloses a vehicle 100 in the process of being tested with a vehicle dynamometer testing system according to the present invention.

The vehicle 100 is a two-wheel drive vehicle, and includes front axle wheel shafts 105, 106, and rear axle wheel shafts 112, 113. The wheels of the vehicle 100 are not shown due to the vehicle being set up for dynamometer testing.

The disclosed vehicle 100 includes a drive train, which includes a combustion engine 101 which is connected to a gearbox 102. The gearbox 102 can be of any suitable kind and, e.g., consist of a manual transmission or an automatic transmission. The front axle wheel (drive) shafts 105, 106 extend from the gear box to the front axle wheels of the vehicle 100.

To this point, the vehicle 100 is similar to a conventional front-wheel drive vehicle. The vehicle 100, however, further includes an electric motor 103, which is connected in series with the combustion engine upstreams of the gearbox 102, but downstreams a clutch 104. The function of the electric motor 103 will be described further below.

A vehicle dynamometer testing system is connected to the vehicle 100, and includes dynamometer test units 110, 111. The dynamometer test units 110, 111 are connected to a measuring and control system 114, such as e.g. a computer with associated display, by means of which the tests are controlled, and by means of which an operator of the system can initiate tests and provide necessary information for performing the dynamometer tests. The measuring and control system 114 transmits control signals to the dynamometer test units to request desired torque and rotational speed. Torque and rotational speed can be measured in different ways, and the torque can be measured directly or indirectly, e.g. by means of a strain gauge as described e.g. in U.S. Pat. No. 4,669,318. As will be explained below, the present invention according to the embodiment disclosed in FIG. 1 includes dynamometer test units including a hydraulic pump and an electric motor, and torque can also be measured, e.g., by measuring hydraulic oil pressure or an electric current.

Figure 2:
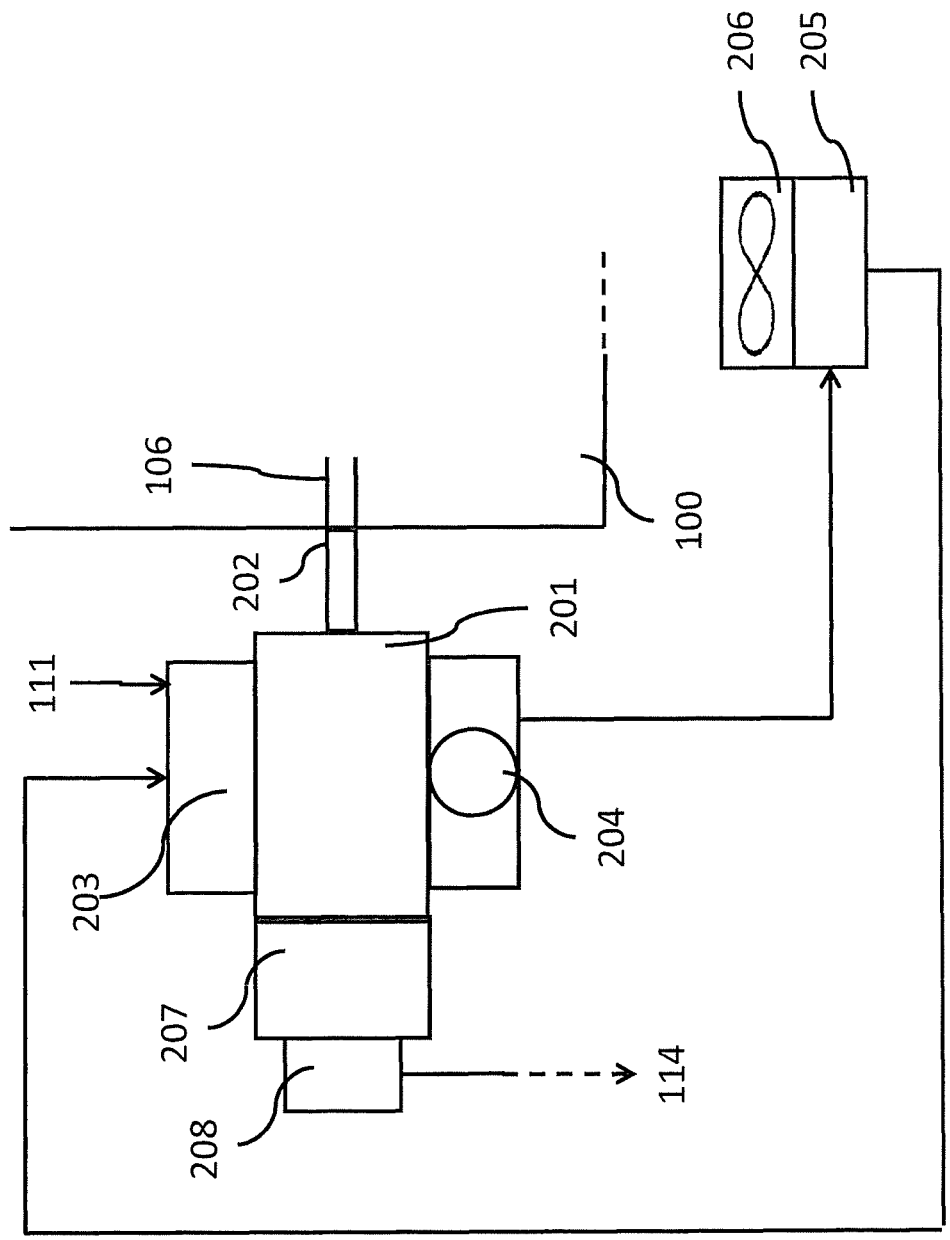
FIG. 2 shows a dynamometer test unit of the system disclosed in FIG. 1 more in detail.

The dynamometer test units 110-111 can consist of substantially identical test units, and are described more in detail in FIG. 2.

As can be seen from FIG. 2, which shows an example of a test unit 111 according to the present invention, each dynamometer test unit 110, 111 includes a dynamometer in the form of a power-absorbing hydrostatic pump assembly, consisting of one (or more) hydraulic pump(s) 201, and means for measuring the torque applied to a pump input shaft 202 (as is explained below, this torque is measured by means of a strain gauge). The pump input shaft 202 is arranged to be rigidly connected to a drive shaft of the vehicle 100. The rigid connection can be accomplished, e.g. by removing the vehicle wheel and attaching the pump input shaft 202 of the test unit to the wheel hub, directly or by means of a suitable adapter, so as to obtain a rigid connection between vehicle and dynamometer test unit in a simple manner utilizing the existing wheel fasteners of the vehicle. The rigid connection has, inter alia, the advantage that rotational speed of a wheel haft can be measured by a suitable sensor measuring rotational speed of the pump input shaft 202.

The dynamometer test units, which e.g. can be standing freely on a floor, are thus connected to the vehicle only by means of a (rigid) coupling to the wheel shafts (wheel hubs) (and possibly some kind of electronic wire connection for communication with the vehicle control system), and hence preferably also "carry" the weight of the vehicle in place of the wheel that has been taken off (it is also contemplated that e.g. some kind of support can be used to at least partly carry the weight of the vehicle).

The pump 201 is connected to a hydraulic oil tank 203 including suitable liquid such as e.g. synthetic oil, and, in use, the hydraulic pump flow and pressure is controlled, e.g. by means of a control valve 204. The output flow from the pump 201 can be restricted by means of the control valve 204, so that a pressure is built up, which tries to turn the pump 201 around its own axle. This turning motion being restricted by a measuring device, e.g. equipped with a strain gauge (not shown), and the signal from the strain gauge is supplied to the common measuring and control system 114.

The control valve 204 can, for example, constitute an ultra fast control valve, such as the kind described in the international patent application WO 2004/111739 A1, by the use of which flows and pressure can be accurately adjusted. Torque and rotational speed of the hydraulic pump 201 is controlled by the measuring and control system 114 by controlling the control valve 204.

A portion of, or the entire liquid flow can be diverted to one or more hydraulic motors 205 for driving e.g. a fan arrangement 206. In this way, power absorbed by the hydraulic pump 201 in the form of pressurised hydraulic liquid is converted to an air stream by means of the fan arrangement.

The air stream can, e.g., be used for cooling purposes. An example of such a solution is explained more in detail in WO2007/008133.

As was mentioned above, the vehicle 100 drive train includes an electric motor 103. In general, vehicle transmissions are becoming increasingly complex. For example, it is becoming more and more common to use hybrid drives in vehicles, such as, e.g. electric hybrid drives, e.g. of the kind disclosed in FIG. 1.

As is known to a person skilled in the art there exist various kinds of electric hybrid drives, and the present invention can be used for testing any such kind.

The vehicle disclosed in FIG. 1 is a parallel hybrid vehicle in which the combustion engine 101 and the electric motor 103 simultaneously and/or sequentially can provide power to the input shaft of the gearbox 102 and thus simultaneously transfer a power to the same vehicle drive wheels from two separate power sources.

By means of the clutch 104, the combustion engine 101 can be selectively connected/disconnected to/from the gearbox input shaft. When the combustion engine 101 is disconnected from the gearbox input shaft, the propelling power of the vehicle can be exclusively provided by the electric motor 103.

When, on the other hand, the combustion engine 101 is connected to the gearbox input shaft, propelling power can be provided simultaneously by the combustion engine 101 and the electric motor 103. Alternatively, the electric motor 103 can be idling and arranged to rotate with the gearbox input shaft without actually providing any power. In this way propelling power can also be provided exclusively by means of the combustion engine 101.

Consequently, the combustion engine 101 can be used to provide drive power to the wheel shafts 105, 106 with or without assistance from the electric motor 103, and vice versa. The combustion engine 101 and the electric motor 103, however, do not operate "on their own", but operation is controlled by means of e.g., a control unit 109 (see FIG. 1) constituting (at least) part of a vehicle control system.

Sophisticated drive trains, e.g. of the kind disclosed in FIG. 1, in combination with a desire for more and more sophisticated measurements, impose increasing demands of the performance of the vehicle dynamometer that can be difficult to meet with prior art solutions. According to the present invention, such complex measurements of vehicle performance are made possible by the dynamometer test unit 110, 111 where two (or more) power absorbing means per dynamometer test unit are used to absorb power of the same vehicle wheel shaft. Apart from the hydraulic pump 201, the dynamometer test unit 111 (and, correspondingly, dynamometer test unit 110), therefore, further includes an electric motor 207.

In the disclosed embodiment, the shaft of the hydraulic pump 201 pass through the hydraulic pump housing so that the electric motor 207 can be connected to the shaft of hydraulic pump 201. In this way the shafts of electric motor 207 and hydraulic pump 201 are rigidly connected and rotationally locked to the wheel shaft 106 to absorb power generated by the combustion engine 101 and/or electric motor 103. The electric motor 207 is power supplied via a power grid by means of an electric motor drive 208, and can constitute an AC or DC motor. The electric motor drive 208 is controlled by the measuring and control system 114 so that the electric motor 207 can be set to desired rotational speed and torque. In the figure, the electric motor drive 208 is shown as being integrated with the electric motor 207. According to an alternative and perhaps more favorable embodiment, the electric motor drive 208, instead, is arranged separate from the electric motor 207, e.g. mounted on a wall, and connected to the electric motor 207 by means of one or more cables.

With regard to dynamometer test unit electric motors, there exist industrial drives that can be used to very accurately control the speed and load torque of AC or DC electric motors and which can advantageously be used when implementing a dynamometer test unit according to the present invention. Such drives often involve direct torque control, DTC, which allows the torque of the electric motor to be the primary control element and not the motor current.

The torque of the electric motor, be it a load torque or propelling torque for use when testing regenerative braking according to the following, can be controlled from zero to full torque within a very short period of time, e.g. milliseconds, which thus makes such drives very suitable for testing according to the above.

Vehicle drive trains of the kind disclosed in FIG. 1 are capable of exhibiting a relatively wide dynamic range with regard to torque-rotational shaft speed dynamics. Thereby, the drive train is also capable of exhibiting very demanding properties from a dynamometer testing point of view.

For example, the vehicle electric motor 103 is capable of providing a very high torque from zero rotational speed, thereby allowing acceleration of the vehicle 100 from stand still with high torque. The combustion engine 101, on the other hand, in general, provides highest torque at high rotational speeds.

The use of two power absorbing means (hydraulic pump 201 and electric motor 207) according to the present invention has the advantage that, e.g., the electric motor 207 can be of a kind that is capable of absorbing high torques at low speeds, while only being capable of providing low torques at high speeds. Hence the electric motor 207 can be of a relatively low power rating, and thereby also relatively small with respect to space and weight, however still being capable of absorbing high starting torques of the vehicle electric motor to thereby allow accurate testing.

The hydraulic pump 201, on the other hand, can be of a kind that is capable of absorbing high power at high speeds. Since hydraulic pumps, in comparison to an electric motor of similar weight and size, is capable of absorbing much higher power, the embodiment disclosed in FIG. 2 provides a solution that is capable of accurately testing driving situations that can arise during travelling with a vehicle using a drive train of the kind disclosed in FIG. 1.

For example, if only the hydraulic pump 201 is used to absorb power generated by the combustion engine 101/electric motor 103, the hydraulic pump, in general, is capable of absorbing high torques at high speeds, or high torques at low speeds, but generally not both at the same time.

If, on the other hand, an electric motor is used instead of hydraulic pump to absorb power, basically the same applies, but in particular, an electric motor being capable of absorbing high torques at high speeds (which often is necessary since vehicle combustion engines often are capable of generating high power), i.e. an electric motor having a high power rating, is heavy, bulky and expensive, in particular when compared to hydraulic pumps having similar power absorbing capabilities.

In addition, an electric motor having a high power rating require a transformer station to provide power to the electric motor, since ordinary e.g. tree-phase sockets are not nearly enough to power e.g. an electric motor capable of delivering/absorbing power in the order of 100 kW or more. This, in turn, results in very high demands with regard to infrastructure at the location of the vehicle dynamometer. The present invention, on the other hand, as described above, is capable of accomplishing the same measurements as dynamometers comprising large electric motors with much less demands in regard of infrastructure, and hence allows portability/possible locations of installation to a considerably higher degree.

For example, the vehicle 100 can be tested for situations where the electric motor alone, or electric motor and combustion engine, is used to accelerate the vehicle from stand still. The use of a dynamometer according to the present invention has the advantage that the electric motor 207 of the dynamometer test unit is capable of absorbing the torque applied on the wheel shaft 106 by the electric motor 103, while the hydraulic pump 201 can absorb the high power that in general are applied by the combustion engine 101.

The present invention, consequently, provides a system that is very advantageous for use when testing vehicles of the kind disclosed in FIG. 1, and which system provides a solution that is advantageous both from cost and space requirement perspective.

In view of the above, the present invention also provides a method for use when testing vehicles.

According to the method, a first controllable power is applied to said first wheel shaft by means of a first individually controllable dynamometer power source, and a second controllable power is applied to said first wheel shaft by means of a second individually controllable dynamometer power source.

Further, electric motors 103 of the kind disclosed in FIG. 1 are often used for regenerative braking. The use of an electric motor 207 in the dynamometer test unit 111 has the advantage that the electric motor 207 cannot only be used to absorb power delivered from the electric motor 103 of the vehicle, but also to provide a power that simulates positive driving force on the vehicle, i.e. a power that motors the wheel shafts of the hybrid drive shafts.

This has the further advantage that the present invention can be used also for testing of regenerative braking. The electric motor 103 can be used for braking purposes, e.g., in order to simulate deceleration of the vehicle 100, in which case the electric motor 103 act as a generator instead of as a motor, and regenerates electrical energy for feed-back to e.g. an energy storage such as a battery (not shown). The regenerated energy can be used to power the electric motor 103 of the vehicle once the need arises again.

The use of dynamometer test units with electric motors thus allows that the hybrid system of the vehicle can be tested not only for accelerations, but also for situations involving regenerative braking. This, in turn, allows that the hybrid system can be subjected to complete test drives, with uphill as well as downhill driving and starts and stop, still using a solution that, as mentioned, is advantageous from cost and space perspective.

With regard to the power absorbed from the wheel shafts 105, 106 by the dynamometer test units 110, 111, the absorbed power can be transported away from the immediate vicinity of the wheel shaft. That is, according to the present invention, power sources are used that absorb power in a way that allows intermediate storage and transportation. According to the disclosed embodiment, absorbed power is converted either to electricity (when absorbed by the electric motor 207) or hydraulic pressure (when absorbed by the hydraulic pump 201). The absorbed and converted power can then be transported away from the immediate vicinity of the wheel shaft, so as to avoid problems with excessive heating that most likely would be the case if absorbed power immediately would be converted into heat at the location of power absorption.

The absorbed power, according to the present invention, can be handled in various ways. For example, as is shown in FIG. 2, pressurised hydraulic liquid flow resulting from power absorption by the hydraulic pump 201 can be diverted to one or more hydraulic motors 205 for driving e.g. fan arrangement 206. The fan arrangement can be used, e.g. for cooling of the combustion engine 101 by blowing air towards the vehicle radiator. With regard to further explanation of this, it is referred to the above-mentioned International Application WO2007/008133.

Power being absorbed by the electric motor 207, on the other hand, is converted to electricity by the electric motor 207, i.e. the electric motor 207 is working as generator. This electric power can, in one embodiment, be fed back to the power grid. This reduces energy consumption during vehicle testing.

Alternatively, or in addition, the generated electric power can be used to drive an electric motor, e.g. to power one or more fans, e.g. for cooling purposes as described above. The absorbed power can also be converted to heat, e.g. by means of a resistor. The resistor can then be located at a suitable location, at enough distance to avoid excessive heating of the wheel shaft, e.g. to merely dissipate the heat, or heat water and/or premises.

In FIG. 2, both the electric motor 207 and hydraulic pump 201 of the dynamometer test unit 111 are connected directly to the wheel shaft 106. This solution has the advantage that a compact dynamometer test unit design can be obtained, without use of gearings etc. It also allows for a compact design so that devices according to the invention can be made portable for easy transportation and/or movement between use for different vehicles.

According to alternative embodiments of the present invention, either or both of the dynamometer power sources are connected to the wheel shaft by means of suitable gearing. For example, the dynamometer electric motor can be arranged on top or to the side of the hydraulic pump, and be connected to the pump input shaft e.g. by means of a synchronous belt (cog belt) so as to ensure slippage free transmission.

In FIG. 2, the dynamometer test units have been described as dynamometer test units consisting of a combination of a hydraulic pump and an electric motor. Such dynamometer test assemblies work particularly well for testing dynamic behaviours and steady state operation of hybrid drive systems.

For example, by means of the system of FIGS. 1-2, the vehicle 100 can be tested during rapid accelerations, and, further, wheel torque throughout the vehicle motor speed range can be easily measured. For example, the dynamometer system according to the present invention can be used instead of the hydraulic pump solution described in U.S. Pat. No. 4,669,318.

As indicated, it is also possible to perform more complex tests using a dynamometer testing system of the disclosed kind, both for two-wheel drive systems as the one disclosed in FIG. 1, and also, using four dynamometer test units, for four-wheel drive systems (in which case dynamometer test units are connected to all driven wheel shafts, at least one of which being a dynamometer test unit according to the present invention). An example of such more complex testing is disclosed in the International patent application WO2007/133154 A1 (Engstroem).

WO2007/133154 A1 essentially describes use of wheel slip values and tire models in vehicle dynamometer testing systems of the disclosed kind.

Because of the characteristics of a tire, if a tractive force is to arise, e.g. to accelerate, retard or maintain speed of the vehicle, the peripheral speed of the tire must be different (higher when motoring (propelling) the vehicle, lower when retarding the vehicle) from the relative speed of the vehicle in relation to the surface (the road) on which the vehicle is travelling when a torque is applied to the wheel. This difference is represented by the slip value, which is defined as relative speed difference between the tire and the underlying surface. The slip value is dependent on several different parameters, such as type of tire, road paving, applied torque to the wheel shaft etc.

By means of the slip value, it is possible to calculate e.g. the manner in which torque produced by power sources will be proportioned between powered wheel shafts, such as wheel shafts 105, 106 of vehicle 100 in FIG. 1 in real-life driving.

The use of wheel slip values in dynamometer testing systems has the advantage that various real-life driving conditions and situations can be accurately simulated in order to thoroughly test the vehicle.

The concept of utilizing individual hydraulic dynamometer test units performing the braking action on the drive shafts, in particular in combination with the use of slip values/tire models, has the advantage that the system can be used to balance torques between e.g. two wheel shafts (or e.g. four wheel shafts of a vehicle with four-wheel drive), which thus allows for accurate testing of vehicles such as the vehicle 100 of FIGS. 1-2 using relevant torque distributions between the various drive shafts, thereby reducing the risk of damaging the drive train of the vehicle being tested by improper loading of the wheel shafts. Such measurements are described more in detail in WO2007/133154 A1.

The dynamometer test unit can measure torque and rotational speed on the wheel shaft to which the dynamometer test unit is connected, and by converting this measured rotational speed to a virtual vehicle speed, by means of a tire-road interface such as a slip value, which, e.g., can be obtained from tire model, the road is simulated and thus act as interconnecting element. The true vehicle speed can, for example, be determined using the equation:

$$\text{Speed}_{wheel\_x}(1-\text{slip}_{wheel\_x}) = \text{Speed}_{wheel\_y}(1-\text{slip}_{wheel\_y})$$

This equation can be set up for all possible wheel shaft combinations of tested wheel shafts (e.g. if the vehicle is a four-wheel drive vehicle), and by means of these equations a true vehicle speed can be calculated. Using this true vehicle speed and the slip value(s) of the wheel shaft(s), the dynamometer test unit(s) can be set so that correct shaft speeds, i.e. shaft speeds that the shafts would have in real-life driving, are obtained and hence very accurate testing is allowed.

With regard to testing of two-wheel drive vehicles, it can also be advantageous, in addition to the dynamometer test units that are connected to the only two driven wheels, to use dynamometer test units for the remaining undriven wheels.

These dynamometer test units are used to rotate the undriven shafts. It can in some situations be necessary to rotate the untested shafts at accurate speed in order to ensure that vehicle internal functions work properly. For example, there can exist vehicle internal functions that give rise to errors if the speed of the non-tested shafts is substantially zero while the tested shafts rotate at high speeds.

The dynamometer test units being connected to the untested shafts can be small since they are only used to cause rotation of untested shafts, and therefore need not be able to provide any high powers. The speed to be used by these additional units can be calculated by means of the equation given above (it is to be noted however, that the slip will be zero for undriven wheels, so essentially it is enough to use driven wheel shaft speeds to determine true vehicle speed).

A dynamometer system according to the present invention can also be used when testing vehicles according to the principles described in the Swedish patent application SE 1000637-7, having the filing date Jun. 14, 2010. According to the principles described therein, vehicles having means for applying a first and second power to one or more wheel shafts by means of two (or more) separate power sources can be accurately tested without actually applying both of said first and second power to a wheel shaft, however still taking contributions from both power sources into account.

That is, only one of said first and second power has to be a real power being provided by a real power source during testing, while the power source of the other power does not apply the said second power during testing or need not even be present in the vehicle during testing. Instead a virtual representation of the said second power is used during testing and ensures that measurement results taking the contribution from the said second power into account is still obtained.

Consequently, according to SE 1000637-7, a virtual representation of the one (or more) power sources providing said virtual second power is used to determine the contribution from simulated power contributions (e.g. from power source (s) not being connected to a dynamometer test unit) so that driving properties of the vehicle can be accurately determined, still taking into account the contribution from the simulated power contribution.

Dynamometer test units according to the present invention can advantageously be used for testing the "real" power source(s) actually being tested in the SE 1000637-7 application.

Further, the invention has been described for a dynamometer test unit power source combination including an electric motor and a hydraulic pump. The two (or more) power sources of the dynamometer test unit, however, can consist of other kinds/combinations of power sources.

According to one embodiment of the present invention, the two dynamometer power sources consist of two electric motors instead of one electric motor and one hydraulic pump. In this embodiment, one of the electric motors is preferably capable of providing high torque at low speed, while the other electric motor is capable of providing high torque at high speed, and hence high power at high speed. Consequently, also solutions where the dynamometer test units consist of electric motors, behavior of a vehicle of the kind described in FIGS. 1-2 can still be accurately tested.

According to another embodiment of the present invention, the two dynamometer power sources consist of two hydraulic pumps instead of one electric motor and one hydraulic pump. In this embodiment, one of the hydraulic pumps is preferably capable of providing high torque at high speed, and hence high power at high speed, as in the embodiment exemplified in FIGS. 1-2, while the other hydraulic pump is capable of providing high torque at low speed.

According to an embodiment of the present invention, one of the two dynamometer power sources consist of a hydraulic pump, while the other dynamometer power source consist of a hydraulic motor. In this embodiment, as above, the hydraulic pump is preferably capable of providing high torque at high speed. The hydraulic motor, on the other hand, is driven by a hydraulic pump (which, in turn, can be driven e.g. by an electric motor or other suitable power source) and can be used to provide a motoring (propelling) power to the vehicle wheel shaft, so as to allow testing, e.g., of regenerative braking by means of vehicle electric motor. There also exist hydraulic pump motors, which are capable of providing negative as well as positive torque, and which can be used, in principle, as the electric motor according to the above. Preferably, as described above, e.g. the pump motor is capable of absorbing high torque at low speed while the hydraulic pump is capable of providing high torque at high speed (high power).

According to a further exemplary embodiment, at least one of the dynamometer test unit power sources consists of an eddy current brake for power absorption. Eddy-current brakes use variable electromagnets to change a magnetic field strength to control applied power. The eddy-current brake is preferably used together with an electric motor so as to obtain a solution where one of the power sources (the electric motor) provide negative/positive torque capability.

According to one exemplary embodiment, one of the dynamometer test unit power sources consists of a water brake for power absorption. Water brakes are capable of high power absorption and can be set such that a given input signal will provide desired torque.

Consequently, various combinations of individually controllable power sources are contemplated according to the present invention. However, only controllable power sources can be used according to the present invention. That is, power sources that repeatedly can be accurately set to a desired and defined torque/power. Controllable power sources allow use of mathematical models of the system to set the power absorbers (dynamometer power sources) to at least essentially the desired torque.

The applied mathematical models are consequently used to depict the behaviour of the dynamical system represented by the vehicle. This is called Model Predictive Control and is thoroughly described in the art of industrial systems. The models are thus used to predict the behaviour of the modelled dynamical system. Use of such models allow very rapid setting of the torque of the dynamometer power sources, which is a requirement for accurate testing of dynamic behaviours. The set torque can be verified, e.g. by measurement with a strain gauge or other suitable means, where this measurement signal can be used to correct deviations with respect to the desired torque order to obtain exactly the desired torque.

Mere use of e.g. strain gauge use in a feed-back control loop would be far too slow when testing dynamic behaviours of the vehicle. According to the present invention, therefore, frictional brakes such as brake discs are excluded from the definition of "controllable power source" according to the present description and claims, since the inherent properties of frictional brakes makes it impossible to use a model of the frictional brake to set accurate enough brake torque. That is, the same control signal will give rise to varying brake powers from time to time due to unpredictability of the frictional brake, which makes it impossible to obtain accurate measurement results. Further, in particular for high power absorption, frictional brakes also generate large amounts of heat that heats the brake itself, thereby even further changing properties of the brake, and giving rise to excessive heating problems of vehicle wheel shaft, other vehicle components and/or the dynamometer test unit.

In fact, power absorbers according to the present invention are preferably of a kind where the majority of the absorbed power is not directly converted to heat, but to an intermediate state, such as e.g. hydraulic pressure or electricity, from which the absorbed power can be dissipated as heat, air streams or in any other suitable form as described above, away from the immediate vicinity of the point of power absorption.

Above, the present invention has been exemplified in connection with testing of a hybrid drive vehicle. Naturally, the present invention is applicable for testing of any kind of vehicle, such as a conventional two or four wheel drive combustion engine vehicle, or any other kind of hybrid vehicle other than what has been disclosed above.

As is apparent from the above, the term power source means a power source that is capable of subjecting a wheel shaft to a power (torque), be it a propelling (positive) torque or braking (negative) torque or combination of both.

The invention claimed is:

1. Dynamometer test unit for use in dynamometer testing of a vehicle, the vehicle including at least a first wheel shaft, said vehicle including at least one first vehicle power source for providing power to said first wheel shaft, said first wheel shaft, during testing, being connected to a first dynamometer test unit, the dynamometer test unit being arranged to be connected to said vehicle by connecting the dynamometer test unit to a wheel hub of said wheel shaft by means of a direct-coupling, said first dynamometer test unit including:
a first individually controllable dynamometer power source for applying a first power to said first wheel shaft,
a second individually controllable dynamometer power source for applying a second power to said first wheel shaft, wherein
during testing, said first and said second dynamometer power source apply a controllable power to said first wheel shaft.

2. Dynamometer test unit according to claim 1, wherein at least one of said first and second dynamometer test unit power sources is capable of providing a negative (braking) power to said wheel shaft, and at least one of said first and second dynamometer power sources is capable of at least providing a positive (motoring) power to said wheel shaft.

3. Dynamometer test unit according to claim 1, wherein at least one of said dynamometer test unit power sources is capable of providing both a negative (braking) and positive (motoring) power to said wheel shaft.

4. Dynamometer test unit according to claim 1, wherein at least one of said first and second dynamometer power sources is an electric motor.

5. Dynamometer test unit according to claim 1, wherein at least one of said first and second dynamometer power sources is a hydraulic pump.

6. Dynamometer test unit according to claim 1, wherein said first and second dynamometer power source apply said controllable power to said first wheel shaft simultaneously or one power source at a time.

7. Dynamometer test unit according to claim 1, wherein the dynamometer test unit includes means for being rigidly coupled to said first wheel shaft.

8. Dynamometer test unit according to claim 1, wherein said power comprises torque.

9. Dynamometer test unit according to claim 1, wherein the dynamometer test unit is arranged to be standing freely on a surface and connected to the vehicle by means of a rigid coupling to the wheel shaft, while supporting the weight of the vehicle by means of said rigid coupling.

10. Dynamometer test unit according to claim 1, wherein controllable power can be selectively applied by said first and said second dynamometer power sources.

11. Dynamometer test unit according to claim 1, wherein said first and second dynamometer power sources have different torque-speed characteristics.

12. Dynamometer test unit according to claim 1, wherein one of said dynamometer power sources is of a kind being capable of delivering high torques at low rotational vehicle wheel shaft speeds, and that another of said first and second dynamometer power source is capable of providing high power at high rotational vehicle wheel shaft speeds.

13. Dynamometer test unit according to claim 1, wherein at least one of said dynamometer power sources is connected to said wheel shaft by means of a gearing.

14. Dynamometer test unit according to claim 1, wherein power absorbed from said vehicle wheel shaft by said dynamometer power sources is absorbed and transported from point of absorption in a controllable manner.

15. Dynamometer test unit according to claim 4 wherein power absorbed by said dynamometer power sources is substantially converted to electricity and/or hydraulic pressure.

16. Vehicle dynamometer system, wherein the vehicle dynamometer system includes at least one dynamometer test unit according to claim 1.

17. System according to claim 16, wherein the vehicle dynamometer system includes at least one second dynamometer test unit for connection to a second tested vehicle wheel shaft.

18. System according to claim 16, wherein the system includes means for, by means of at least one mathematical model, predicting behavior of the vehicle wheel shaft and setting torque of at least one of the dynamometer power sources in accordance with the predicted behavior.

19. System according to claim 16, wherein, when power is applied to said first wheel shaft by said vehicle power source, the system includes means for, by means of said dynamometer test unit, applying a load to said first wheel shaft, said load substantially corresponding to the load that said first wheel shaft would be subjected to when said vehicle is being driven on a road subjected to said power applied by said vehicle power sources.

20. Dynamometer test unit according to claim 19, wherein a virtual vehicle speed is obtained by determining slip-values for all wheel shafts being subjected to a power by a vehicle power source.

21. Method for use in dynamometer testing of a vehicle, the vehicle including at least a first wheel shaft, said vehicle including at least one first vehicle power source for providing power to said first wheel shaft, said first wheel shaft being connected to a first dynamometer test unit, the dynamometer test unit being connected to said vehicle by the dynamometer test unit being connected to a wheel hub of said wheel shaft by means of a direct-coupling, said method including:
  applying a first controllable power to said first wheel shaft by means of a first individually controllable dynamometer power source, and
  applying a second controllable power to said first wheel shaft by means of a second individually controllable dynamometer power source.

* * * * *